United States Patent
Abe et al.

(10) Patent No.: US 10,112,247 B2
(45) Date of Patent: Oct. 30, 2018

(54) WIRE ELECTRIC DISCHARGE MACHINE HAVING MOVABLE AXIS ABNORMAL LOAD WARNING FUNCTION

(71) Applicant: FANUC Corporation, Yamanashi (JP)

(72) Inventors: Hiroyuki Abe, Yamanashi (JP); Kaoru Hiraga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 79 days.

(21) Appl. No.: 15/271,257

(22) Filed: Sep. 21, 2016

(65) Prior Publication Data

US 2017/0087654 A1 Mar. 30, 2017

(30) Foreign Application Priority Data

Sep. 29, 2015 (JP) ................. 2015-191111

(51) Int. Cl.
*G06F 19/00* (2018.01)
*B23H 1/02* (2006.01)
(Continued)

(52) U.S. Cl.
CPC ............. *B23H 1/02* (2013.01); *G05B 13/027* (2013.01); *G05B 19/19* (2013.01); *G06N 3/08* (2013.01);
(Continued)

(58) Field of Classification Search
CPC .... B23H 1/02; B23H 2400/00; G05B 13/027; G05B 19/19; G05B 2219/32335; G05B 2219/45221; G06N 7/005; G06N 3/08
(Continued)

(56) References Cited

U.S. PATENT DOCUMENTS

| 5,428,201 A | 6/1995 | Kaneko et al. |
| 6,060,854 A * | 5/2000 | Yutkowitz ............ G05B 19/404 318/574 |

(Continued)

FOREIGN PATENT DOCUMENTS

| EP | 3135417 A1 | 3/2017 |
| JP | 6-170645 A | 6/1994 |
| JP | 2007072879 A | 3/2007 |

OTHER PUBLICATIONS

Office Action in JP Application No. 2015-191111, dated Oct. 3, 2017, 5 pp.
(Continued)

*Primary Examiner* — Ziaul Karim
(74) *Attorney, Agent, or Firm* — Hauptman Ham, LLP

(57) ABSTRACT

A wire electric discharge machine includes a machine learning device that learns an adjustment of an axis feed command of the wire electric discharge machine. The machine learning device determines an adjustment amount of the axis feed command by using data related to a movement state of an axis, and adjusts the axis feed command based on the determined adjustment amount of the axis feed command. Subsequently, the machine learning device performs machine learning of the adjustment of the axis feed command based on the determined adjustment amount of the axis feed command, the data related to the movement state of the axis, and a reward calculated based on the data related to the movement state of the axis.

6 Claims, 6 Drawing Sheets

(51) Int. Cl.
*G05B 19/19* (2006.01)
*G06N 3/08* (2006.01)
*G06N 7/00* (2006.01)
*G05B 13/02* (2006.01)

(52) U.S. Cl.
CPC ......... *G06N 7/005* (2013.01); *B23H 2400/00* (2013.01); *G05B 2219/32335* (2013.01); *G05B 2219/45221* (2013.01)

(58) Field of Classification Search
USPC .......................................................... 700/162
See application file for complete search history.

(56) References Cited

U.S. PATENT DOCUMENTS

| | | | |
|---|---|---|---|
| 2005/0137739 A1* | 6/2005 | Yoshida | G05B 19/404 700/170 |
| 2007/0051701 A1* | 3/2007 | Ogata | B23H 7/20 219/69.17 |
| 2007/0052383 A1 | 3/2007 | Abe et al. | |
| 2009/0112357 A1* | 4/2009 | Hammond | B23P 6/002 700/194 |
| 2015/0266122 A1* | 9/2015 | Nakagawa | B23H 1/02 700/162 |
| 2017/0060105 A1 | 3/2017 | Onodera et al. | |

OTHER PUBLICATIONS

Extended European Search Report in EP Application No. 16187503.4, dated May 24, 2017.
Lin Chin-Teng et al, "Improvement of machining accuracy by fuzzy logic at corner parts for wire-EDM", Fuzzy Sets and Systems, Feb. 17, 2000, pp. 499-511, vol. 122 (2001), Elsevier, Holland.
Abhijit Gosavi, "Reinforcement Learning: A Tutorial Survey and Recent Advances", INFORMS Journal on Computing, May 1, 2009, pp. 178-192, Spring 2009, vol. 21, No. 2, INFORMS, U.S.A.
Carlos Henrique et al., "A Tutorial on Reinforcement Learning Techniques", Technological Institute of Aeronautics, Jan. 1, 1999, Sao Jose dos Campos, Brazil, retrieved from the Internet.
Lin Cheng-Jian et al., "Reinforcement Learning for an ART-Based Fuzzy Adaptive Learning Control Network", IEEE Transactions on Neural Networks, vol. 7, No. 3, May 1, 1996, IEEE Service Center, U.S.A.

* cited by examiner

WIRE ELECTRIC DISCHARGE MACHINE HAVING MOVABLE AXIS ABNORMAL LOAD WARNING FUNCTION

RELATED APPLICATIONS

The present application claims priority to Japanese Patent Application Number JP2015-191111, filed Sep. 29, 2015, the disclosure of which is hereby incorporated by reference herein in its entirety.

BACKGROUND OF THE INVENTION

1. Field of the Invention

The present invention relates to a wire electric discharge machine, and in particular, to a wire electric discharge machine having a function of adjusting a movement command of a movable axis and a threshold value of an abnormal load level in accordance with the state of the movable axis and the state of an environment in which the machine is placed.

2. Description of the Related Art

When a wire electric discharge machine is used, there are cases where an erroneous operation of an operator leads to collision of a wire guide section with a workpiece or a jig for fixing the workpiece. Japanese Patent Application Laid-open No. 2007-72879, for example, discloses a technique to cope with such cases through monitoring a load amount of a movable axis and preventing damage to a mechanical section of the movable axis, e.g. a wire guide section, by stopping the movable axis by an alarm stop in the case where the load amount reaches a set threshold value (see FIG. 8).

However, the wire guide section of the wire electric discharge machine is usually formed of a material that is damaged relatively easily, such as plastic, and hence, even when the technique disclosed in Japanese Patent Application Laid-open No. 2007-72879 is used, if the threshold value is set to a large value, the mechanical section may become damaged before the movable axis is stopped by the alarm stop, as shown in FIG. 9. On the other hand, when the threshold value is set to a small value with the intention to stop the movable axis by the alarm stop before the mechanical section is damaged, the alarm stop is activated due to even a slight load fluctuation in normal operation, leading to deterioration in operability.

In general, axial loading is high in the case where the viscosity of a lubricant is high in a low temperature state, and the axial loading is low in the case where the viscosity of the lubricant is low in a high temperature state. Meanwhile, axial loading is low in the case where an axial movement is performed at a low speed and the axial loading is high in the case where the axial movement is performed at a high speed, and this is especially conspicuous at the start of the axial movement. As shown in FIG. 10, in the case where the axial movement is performed in the low temperature state, the axial loading suddenly increases and the alarm is issued when the axial movement is performed at a highspeed from the start. However, as shown in FIG. 11, when the axial movement is started at a low speed in the beginning and the lubricant is applied for softening, then even in the case where the axis is moved subsequently at a high speed, the axial loading does not increase suddenly and the alarm is not issued. Application of the lubricant is, nevertheless, troublesome for an operator during preparation work, and again, deteriorates operability.

As described above, in the case where the axial movement is stopped by the alarm stop, it is necessary to set the threshold value of the alarm stop to a proper value and adjust a movement command of the movable axis in accordance with the state of the environment, and these operations are problematic in that they impose a considerably heavy burden on the operator.

SUMMARY OF THE INVENTION

Under these circumstances, an object of the present invention is to provide a wire electric discharge machine that includes the function of adjusting the movement command of the movable axis and the threshold value of the abnormal load level in accordance with the state of the movable axis and the state of the environment in which the machine is placed.

A wire electric discharge machine according to the present invention moves an axis in accordance with an axis feed command by a program or an operation of an operator, and includes a machine learning device that performs machine learning of an adjustment target parameter of the axis feed command in the movement of the axis and an adjustment amount of the adjustment target parameter. The machine learning device includes a state observation section that acquires state data as information indicative of a movement state of the axis in the movement of the axis, a reward condition setting section that sets a reward condition, a reward calculation section that calculates a reward based on the state data and the reward condition, an axis feed command adjustment learning section that performs the machine learning of an axis feed command adjustment, and an axis feed command output section that determines the adjustment target parameter of the axis feed command and the adjustment amount of the adjustment target parameter as an adjustment action based on a result of the machine learning of the axis feed command adjustment by the axis feed command adjustment learning section and the state data, adjusts the axis feed command based on the determined adjustment action, and outputs the adjusted axis feed command. The axis feed command adjustment learning section performs the machine learning of the axis feed command adjustment based on the adjustment action, the state data acquired by the state observation section after the movement of the axis based on the outputted adjusted axis feed command, and the reward calculated by the reward calculation section.

The state data may include at least any of a load of the axis, a command speed of the axis, a speed of the axis, a command acceleration of the axis, an acceleration of the axis, an abnormal load level of the axis, damage to a mechanical section of the axis, an ambient room temperature, and an ambient humidity.

The adjustment target parameter of the axis feed command may include at least any of a speed of the axis, an acceleration of the axis, and an abnormal load level of the axis.

The wire electric discharge machine may further include a learning result storage section that stores the result of the learning by the axis feed command adjustment learning section, and the axis feed command output section may adjust the axis feed command of the axis based on the result of the learning of the axis feed command adjustment by the axis feed command adjustment learning section and the result of the learning of the axis feed command adjustment stored in the learning result storage section.

The reward condition may provide a positive reward in a case where a speed of the axis reaches a command speed of the axis quickly, in a case where a load of the axis does not exceed an abnormal load level of the axis during the movement of the axis, or in a case where damage to a mechanical section of the movable axis does not occur at a time of a collision of a movable axis, and the reward condition may provide a negative reward in a case where the speed of the axis reaches the command speed of the axis slowly, in a case where the load of the axis exceeds the abnormal load level of the axis during the movement of the axis, or in a case where damage to the mechanical section of the movable axis occurs at the time of the collision of the movable axis.

The wire electric discharge machine may be connected to at least one other wire electric discharge machine, and exchange or shares the result of the machine learning with the other wire electric discharge machine.

A first aspect of a machine learning device according to the present invention is a machine learning device that performs machine learning of an adjustment of an axis feed command in a movement of a axis in a wire electric discharge machine, and the machine learning device includes a learning result storage section that stores a result of the machine learning of the adjustment of the axis feed command, a state observation section that acquires state data as information indicative of a movement state of the axis in the movement of the axis, and an axis feed command output section that determines an adjustment target parameter of the axis feed command and an adjustment amount of the adjustment target parameter as an adjustment action based on the result of the machine learning of the adjustment of the axis feed command stored in the learning result storage section and the state data, adjusts the axis feed command in the movement of the axis based on the determined adjustment action, and outputs the adjusted axis feed command.

A second aspect of the machine learning device according to the present invention is a machine learning device that performs machine learning of an adjustment of an axis feed command in a movement of a axis in a wire electric discharge machine, and the machine learning device includes a state observation section that acquires state data as information indicative of a movement state of the axis in the movement of the axis, a reward condition setting section that sets a reward condition, a reward calculation section that calculates a reward based on the state data and the reward condition, an axis feed command adjustment learning section that performs the machine learning of the axis feed command adjustment, and an axis feed command output section that determines an adjustment target parameter of the axis feed command and an adjustment amount of the adjustment target parameter as an adjustment action based on a result of the machine learning of the axis feed command adjustment by the axis feed command adjustment learning section and the state data, adjusts the axis feed command based on the adjustment action, and outputs the adjusted axis feed command. The axis feed command adjustment learning section performs the machine learning of the axis feed command adjustment based on the adjustment action, the state data acquired by the state observation section after the movement of the axis based on the outputted adjusted axis feed command, and the reward calculated by the reward calculation section.

The machine learning device that performs the machine learning of the adjustment of the axis feed command may further include a learning result storage section that stores the result of the learning by the axis feed command adjustment learning section, and the axis feed command output section may adjust the axis feed command of the axis based on the result of the learning of the axis feed command adjustment by the axis feed command adjustment learning section and the result of the learning of the axis feed command adjustment stored in the learning result storage section.

In the present invention, by adjusting the movement command of the movable axis and the threshold value of the abnormal load level by using a machine learning, it becomes possible to avoid damage to the mechanical section caused by the erroneous operation, and improve the operability during the normal operation.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
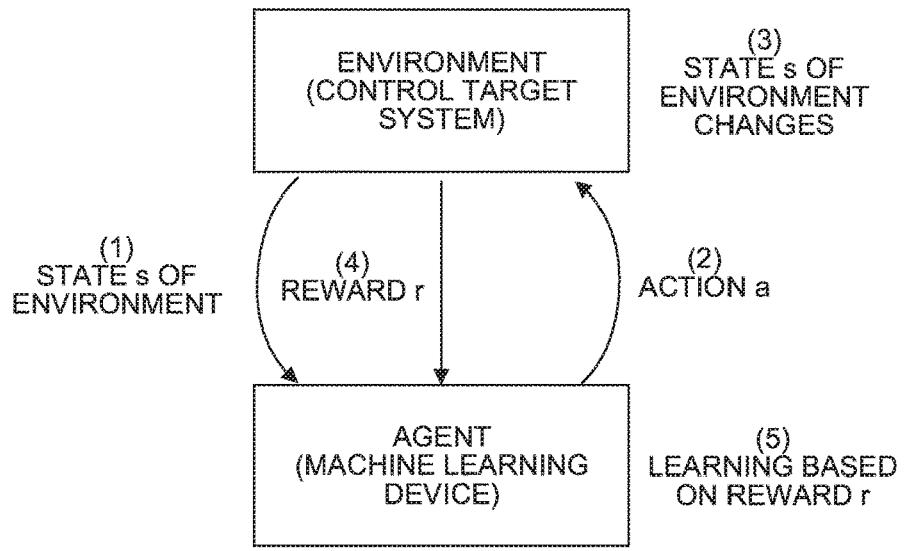
FIG. 1 is a view for explaining a basic concept of a reinforcement learning algorithm.

In the present invention, a machine learning device as artificial intelligence is introduced into a wire electric discharge machine that machines workpiece. "Data related to a movement state of a movable axis" such as a load of the movable axis, a speed of the movable axis, an acceleration of the movable axis, an operation time of the movable axis, an abnormal load level of the movable axis, damage to a mechanical section of the movable axis, a room temperature, and a humidity is acquired from the wire electric discharge machine, and machine learning related to an adjustment of an axis feed command of the speed and the acceleration of the movable axis and the abnormal load level of the movable axis with respect to the "data related to the movement state of the movable axis" is performed. By doing so, the adjustment is performed such that the axis feed command is optimized in accordance with the state of the movable axis.

Hereinbelow, the machine learning introduced in the present invention will be briefly described.

<1. Machine Learning>

Herein, the machine learning will be briefly described. The machine learning is implemented by extracting useful rules, knowledge representation, and criteria for judgment from the set of data inputted to a device that performs the machine learning (hereinafter referred to as a machine learning device) by analysis, outputting the analysis result, and performing learning of knowledge. There are various methods of the machine learning, and the machine learning is roughly divided into "supervised learning", "unsupervised learning", and "reinforcement learning". Further, in order to implement these methods, there is a method called "deep machine learning" in which extraction of a feature amount itself is learned.

In the "supervised learning", a large number of sets of data on an input and a result (label) are given to a machine learning device and then a feature in data sets is learned so that a model estimating the result from the input, that is, its relationship, can be acquired inductively. This can be implemented by using an algorithm such as a neural network described later.

In the "unsupervised learning", a large amount of only input data is given to a learning device to learn how the input data is distributed, thereby learning a device that compresses, classifies, and shapes input data without giving corresponding teacher output data. It is possible to perform clustering of similar features in the data set. Using this result, it is possible to implement output prediction by providing a criterion and allocating the output that can optimize the criterion.

In addition, there is a method called "semi-supervised learning" as an intermediate problem setting between the "unsupervised learning" and the "supervised learning". In the "semi-supervised learning", a part of data is a set of data on an input and data on an output and remaining part of the data is data on only input. In the present embodiment, data that can be acquired without actually operating the wire electric discharge machine is used in the unsupervised learning so that learning can be performed efficiently.

In the "reinforcement learning", a proper action is learned based on an interaction which an action gives to an environment, by learning the action, in other words, learning for maximizing a reward that is obtained in the future is performed. In the reinforcement learning, it is possible to start the learning in a state in which the machine learning device does not know at all the result caused by the action or a state in which the machine learning device knows the result only incompletely. In addition, it is also possible to cause the machine learning device to start the learning from a good start point in an initial state in which preliminary learning has been performed in a manner such that a human action is imitated (by method such as the supervised learning or inverse reinforcement learning described above).

Note that, in the case where the machine learning is applied to the wire electric discharge machine, it is necessary to take into consideration the fact that a result cannot be obtained as data until a wire electric discharge machine actually operates, in other words, it is necessary to search for an optimum action by trial and error. To cope with this, the present invention adopts an algorithm of reinforcement learning in which a machine learning device automatically learns an action for attaining a target by providing a reward as a main learning algorithm of the machine learning device.

FIG. 1 is a diagram for describing the basic concept of a reinforcement learning algorithm.

In reinforcement learning, agent learning and an action are advanced by the interactions between an agent (machine learning device) acting as a learning subject and an environment (control target system) acting as a control target. More specifically, the following interactions are performed between the agent and the environment.

(1) The agent observes an environmental state $s_t$ at a certain time.

(2) The agent selects and performs an action $a_t$ that the agent is allowed to take based on an observation result and past learning.

(3) The environmental state $s_t$ changes to a next state $s_{t+1}$ after the action $a_t$ is performed.

(4) The agent accepts a reward $r_{t+1}$ based on the state change as a result of the action $a_t$.

(5) The agent advances the learning based on the state $s_t$, the action $a_t$, the reward $r_{t+1}$, and a past learning result.

At the initial stage of the reinforcement learning, the agent has no knowledge at all about a criterion of value judgment for selecting the optimum action $a_t$ with respect to the state $s_t$ of the environment in the action selection in (2) mentioned above. To cope with this, the agent selects various actions $a_t$ in a given state $s_t$, and learns selection of a better action, i.e., the correct criterion of value judgment based on the reward $r_{t+1}$ for the action $a_t$.

In the learning of the above processing (5), the agent acquires the mapping of an observed state $s_t$, an action $a_t$, and a reward $r_{t+1}$ as reference information for determining an amount of a reward that the agent is allowed to obtain in the future. For example, when the number of states that the agent is allowed to have at each time is m and the number of actions that the agent is allowed to take is n, the agent obtains a two-dimensional arrangement of m×n, in which rewards $r_{t+1}$ corresponding to pairs of states $s_t$ and actions $a_t$ are stored, by repeatedly performing actions.

Then, with a value function (evaluation function) indicating to what degree a selected state or action is valuable based on the above acquired mapping, the agent updates the value function (evaluation function) while repeatedly performing actions to learn an optimum action corresponding to a state.

A "state value function" is a value function indicating to what degree a certain state $s_t$ is valuable. The state value function is expressed as a function using a state as an argument and updated based on a reward obtained with respect to an action in a certain state, a value of a future state changed with the action, or the like in learning from repeated actions. The update formula of the state value function is defined according to a reinforcement learning algorithm. For example, in TD (Temporal-Difference) learning indicating as one of reinforcement learning algorithms, the state value function is defined by the following formula (1). Note that in the following formula (1), α is called a learning coefficient, γ is called a discount rate, and the learning coefficient and the discount rate are defined to fall within 0<α≤1 and 0<γ≤1, respectively.

$$V(s_t) \rightarrow V(s_t) + \alpha[r_{t+1} + \gamma V(s_{t+1}) - V(s_t)] \quad (1)$$

In addition, an "action value function" is a value function indicating to what degree an action $a_t$ is valuable in a certain state $s_t$. The action value function is expressed as a function using a state and an action as arguments and updated based on a reward obtained with respect to an action in a certain state, an action value of a future state changed with the action, or the like in learning from repeated actions. The update formula of the action value function is defined according to a reinforcement learning algorithm. For example, in Q-learning indicating as one of typical reinforcement learning algorithms, the action value function is updated by the following formula (2). Note that in the following formula (2), α is called a learning coefficient, γ is called a discount rate, and the learning coefficient and the discount rate are defined to fall within 0<α≤1 and 0<γ≤1, respectively.

$$Q(s_t, a_t) \leftarrow Q(s_t, a_t) + \alpha \left( r_{t+1} + \gamma \max_a Q(s_{t+1}, a) - Q(s_t, a_t) \right) \quad (2)$$

Formula (2) shown above represents a method of updating an evaluation value Q ($s_t$, $a_t$) of the action $a_t$ in the state $s_t$ based on the reward $r_{t+1}$ returned as the result of the action $a_t$. Formula (2) shows that Q ($s_t$, $a_t$) is increased when the evaluation value Q ($s_{t+1}$, max (a)) of the best action max (a) in the next state caused by the reward $r_{t+1}$ and the action $a_t$ is larger than the evaluation value Q ($s_t$, $a_t$) of the action $a_t$ in the state $s_t$, whereas Q ($s_t$, $a_t$) is reduced when the evaluation value Q ($s_{t+1}$, max (a)) of the best action max (a) in the next state caused by the reward $r_{t+1}$ and the action $a_t$ is smaller than the evaluation value Q ($s_t$, $a_t$) of the action $a_t$ in the state $s_t$. That is, the value of a given action in a given state is caused to approach the reward returned immediately as the result and the value of the best action in the next state caused by the action.

The Q-learning aims to cause Q ($s_t$, $a_t$) to have an expectation value E [$\Sigma \gamma^t r_t$] finally by repeating the above update (the expectation value is a value obtained when the state changes according to the optimum action; of course, the value is not yet found so that the agent has to perform the learning while searching for the expectation value).

Further, in the selection of an action in the above processing (2), an action $a_t$ by which a reward ($r_{t+1} + r_{t+2} + \ldots$) over a future becomes maximum in a current state $s_t$ (an action for changing to a most valuable state when a state value function is used or a most valuable action in the state when an action value function is used) is selected using a value function (evaluation function) generated by past learning. Note that during learning, an agent may select a random action with a constant probability for the purpose of advancing the learning in the selection of an action in the above processing (2) (ε-greedy method).

Note that, as a method of storing the value function (evaluation function) as the learning result, there are a method of holding the values of all of pairs of state and action (s, a) in the form of a table (action value table), and a method of preparing a function that approximates the above value function. In the latter method, the above-described update formula can be implemented by adjusting parameters of an approximation function by a method such as a method for probabilistic gradient descent. As the approximation function, it is possible to use a supervised learning device such as the neural network.

Figure 2:
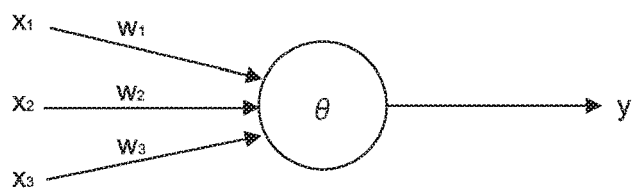
FIG. 2 is a schematic view showing a neuron model.

The neural network is constituted by an arithmetic unit and a memory that implement the neural network that simulates a neuron model shown in FIG. 2. FIG. 2 is a schematic view showing the neuron model.

As shown in FIG. 2, the neuron outputs an output y corresponding to a plurality of inputs x (herein, as an example, inputs $x_1$ to $x_3$). The individual inputs $x_1$ to $x_3$ are weighted with weights w ($w_1$ to $w_3$) corresponding to the inputs x. With this, the neuron outputs the output y represented by the following Formula (3). Note that, in Formula (3), all of the input x, the output y, and the weight w are vectors. In addition, θ is a bias, and $f_k$ is an activation function.

$$y = f_k (\Sigma_{i=1}^n x_i w_i - \theta) \quad (3)$$

Next, the neural network having weights of three layers combined with the above-described neuron will be described with reference to FIG. 3.

Figure 3:
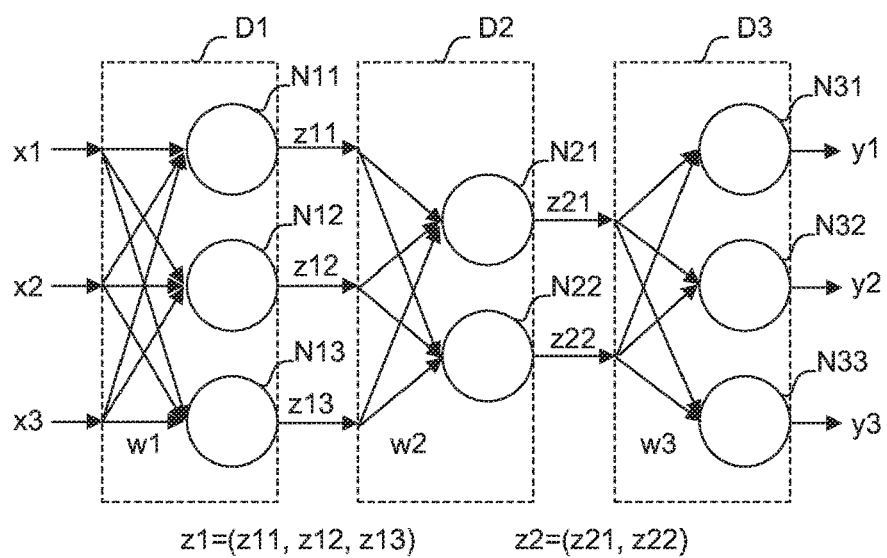
FIG. 3 is a schematic view showing a neural network having weights of three layers.

FIG. 3 is a schematic view showing the neural network having the weights of three layers D1 to D3. As shown in FIG. 3, a plurality of inputs x (herein, as an example, inputs x1 to x3) are inputted from the left side of the neural network, and results y (herein, as an example, results y1 to y3) are outputted from the right side thereof.

Specifically, the inputs x1 to x3 are weighted with weights corresponding to three neurons N11 to N13 and are inputted. The weights to the inputs are collectively written as w1. The neurons N11 to N13 output z11 to z13 respectively. z11 to z13 are collectively written as a feature vector z1, and can be regarded as a vector obtained by extracting feature amounts of input vectors. The feature vector z1 is the feature vector between the weight w1 and a weight w2.

Z11 to z13 are weighted with weights corresponding to two neurons N21 and N22 and are inputted. The weights to these feature vectors are collectively written as w2. The neurons N21 and N22 output z21 and z22 respectively. These are collectively written as a feature vector z2. The feature vector z2 is the feature vector between the weight w2 and a weight w3.

The feature vectors z21 and z22 are weighted with weights corresponding to three neurons N31 to N33 and are inputted. The weights to the feature vectors are collectively written as w3.

Lastly, the neurons N31 to N33 output the results y1 to y3 respectively.

The operation of the neural network includes a learning mode and a value prediction mode. The weight w is learned by using a learning data set in the learning mode, and action determination of the wire electric discharge machine is performed by using parameters of the learning in the prediction mode (the word "prediction" is used for the convenience of description, but various tasks such as detection, classification, and inference are allowed).

It is possible to learn data obtained by actually operating the wire electric discharge machine in real time in the prediction mode and reflect the data in the next action (online learning), and it is also possible to perform the learning in which data group collected in advance is used collectively and, thereafter, perform a detection mode by using parameters of the learning (batch learning). Further, an intermediate learning mode is also possible where a learning mode is adopted every time a certain amount of data is stored.

The weights w1 to w3 can be learned by an error back propagation method. Information on an error enters from the right side and flows to the left side. The error back propagation method is a method in which the weight is adjusted (learned) for each neuron such that a difference between the output y when the input x is inputted and a true output y (teacher) is reduced.

In the neural network, it is possible to have three or more layers (referred to as deep machine learning). Performing feature extraction of the input stepwise, it is possible to automatically acquire, from only teacher data, an arithmetic unit that regresses the result.

By using such a neural network as an approximation function, the above-described value function (evaluation function) is stored while (1) to (5) in the process of the reinforcement learning described above are repeated, and the learning can be advanced.

Thus, even in a new environment after the completion of learning in a certain environment, the learning may be advanced so as to be adapted to the new environment by performing an additional learning. Consequently, even in the case where the reinforcement learning is applied to control of a new wire electric discharge machine by applying the reinforcement learning to an adjustment of the axis feed command of the speed and the acceleration of the movable axis and the abnormal load level of the movable axis in the wire electric discharge machine as in the present invention, it becomes possible to perform the learning of the adjustment of the axis feed command in a short time period by performing the additional learning in the new environment in addition to the previous learning of the adjustment of the axis feed command.

In addition, in the reinforcement learning, a system in which a plurality of the agents are connected via a network or the like is constituted, and information such as the state s, the action a, and the reward r is shared by the agents and used in the learning of each agent, whereby it is possible to perform efficient learning by performing distributed reinforcement learning in which the individual agents perform the learning in consideration of the environments of the other agents. In the present invention as well, a plurality of agents (machine learning devices) that control a plurality of environments (wire electric discharge machines) perform distributed machine learning in a state in which they are connected via the network or the like, whereby it becomes possible to cause each agent to efficiently perform the learning of the adjustment of the axis feed command in the wire electric discharge machine.

Note that although various methods such as Q-learning, an SARSA method, TD learning, and an AC method have been commonly known as reinforcement learning algorithms, any of the above reinforcement algorithms may be applied to the present invention. Since each of the reinforcement learning algorithms has been commonly known, its detailed description will be omitted in the specification.

Hereinafter, a description will be given, based on a specific embodiment, of the wire electric discharge machine of the present invention into which a machine learning device is introduced.

2. Embodiment

Figure 4:
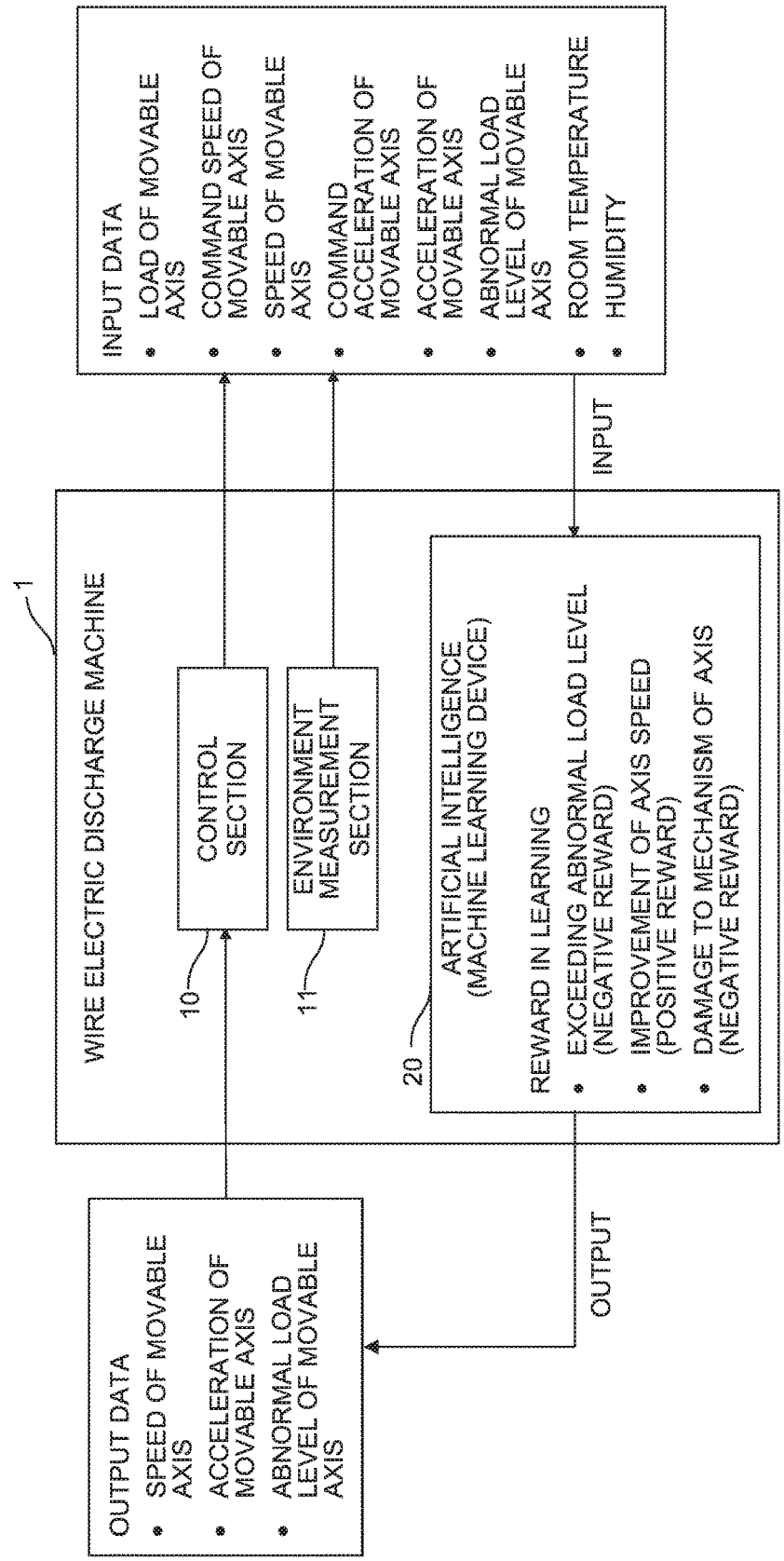
FIG. 4 is a view of an image related to machine learning of a wire electric discharge machine according to an embodiment of the present invention.

FIG. 4 is a view showing an image related to the machine learning of the adjustment of the axis feed command of the speed and the acceleration of the movable axis and the abnormal load level of the movable axis in the wire electric discharge machine into which the machine learning device according to an embodiment of the present invention is introduced. Note that FIG. 4 shows only the configuration required to explain the machine learning in the wire electric discharge machine according to the present embodiment.

In the present embodiment, state information such as the load of the movable axis, a command speed of the movable axis, the speed of the movable axis, a command acceleration of the movable axis, the acceleration of the movable axis, the abnormal load level of the movable axis, damage to the mechanical section of the movable axis, and a room temperature and a humidity around a wire electric discharge machine 1 during the movement of the axis in the wire electric discharge machine 1 is inputted to a machine learning device 20 as information for the machine learning device 20 to determine the environment (the state $s_t$ described in "<1. Machine learning>"). The individual values are data acquired from the individual sections of the wire electric discharge machine 1 (a control section 10, an environment measurement section 11, a drive section such as a servomotor, and various sensors).

In the present embodiment, as the output of the machine learning device 20 to the environment (the action $a_t$ described in "<1. Machine learning>"), the adjustment of the axis feed command of the speed of the movable axis, the acceleration of the movable axis, and the abnormal load level of the movable axis during the movement of the axis in the wire electric discharge machine 1 is used as the output data.

Figure 5A:
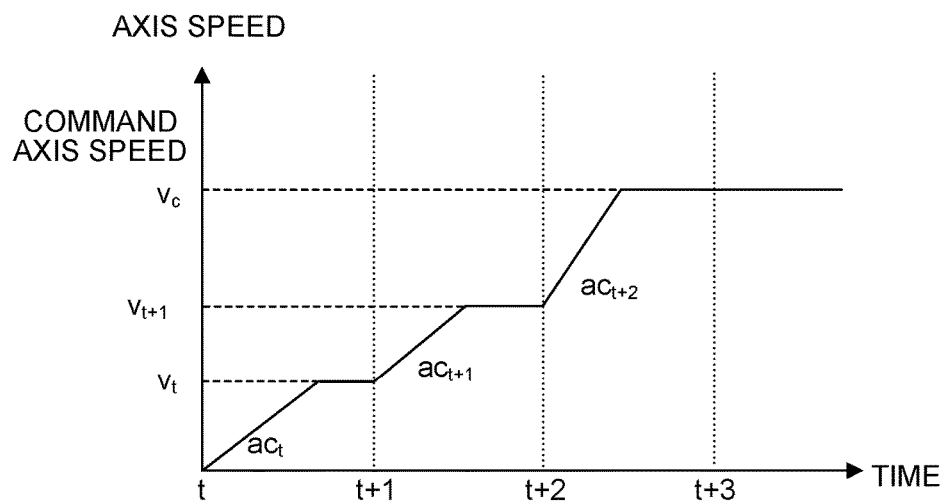
FIGS. 5A and 5B are views for explaining an outline of an axial feeding adjustment of the wire electric discharge machine of FIG. 4.
Figure 5B:
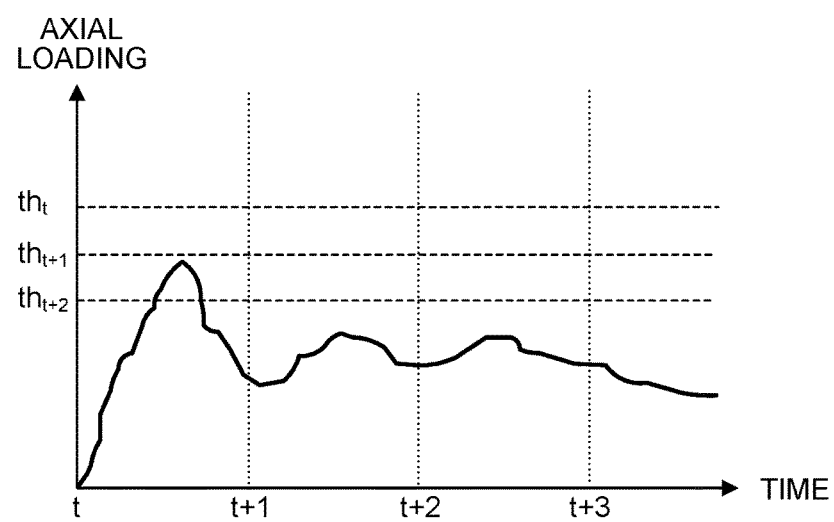

FIG. 5 is a view for explaining each data related to the movement of the axis of the wire electric discharge machine 1 according to the present embodiment.

When the usual wire electric discharge machine 1 is commanded to move the axis, the wire electric discharge machine 1 increases the movement speed to the speed specified by the movement command with the acceleration determined from a time constant set for the axis, and then moves the axis at the movement speed specified by the movement command. In contrast to this, in the wire electric discharge machine 1 of the present embodiment, when the wire electric discharge machine 1 is commanded to move the axis, the machine learning device 20 acquires the state information of the wire electric discharge machine 1 at every operation cycle, determines the adjustment of the speed, the acceleration, and the abnormal load level of the movable axis at the corresponding time based on the acquired state information, and outputs the speed, the acceleration, and the abnormal load level of the movable axis determined by the adjustment to the wire electric discharge machine 1. For example, as shown in FIG. 5, at time t, the speed of the movable axis is adjusted to $v_t$, the acceleration thereof is adjusted to $ac_t$, and the abnormal load level thereof is adjusted to $th_t$. The adjustment of the speed, the acceleration, and the abnormal load level of the movable axis by the machine learning device 20 is performed until the movement speed of the axis reaches the movement speed specified by the original movement command or the movement of the axis is ended.

In addition, in the present embodiment, as the reward given to the machine learning device 20 (the reward $r_t$ described in "<1. Machine learning>"), the magnitude relation between the load and the abnormal load level of the movable axis (negative reward), the speed of the movable axis (positive reward), and occurrence of damage to the mechanical section of the movable axis (negative reward) are adopted.

Note that an operator may appropriately set which data the determination of the reward is based on.

Moreover, in the embodiment, the machine learning device 20 performs machine learning based on input data, output data, and a reward described above. In the machine learning, a state $s_t$ is defined by the combination of input data at certain time t, an adjustment of axial feeding performed with respect to the defined state $s_t$ is equivalent to an action $a_t$, and a value evaluated and calculated based on input data newly obtained as a result of the adjustment of axial feeding due to the action $a_t$ is equivalent to a reward $r_{t+1}$. As in "(1) Machine Learning" described above, the state $s_t$, the action $a_t$, and the reward $r_{t+1}$ are applied to the update formula of a value function (evaluation function) corresponding to a machine-learning algorithm to advance the learning.

Figure 6:
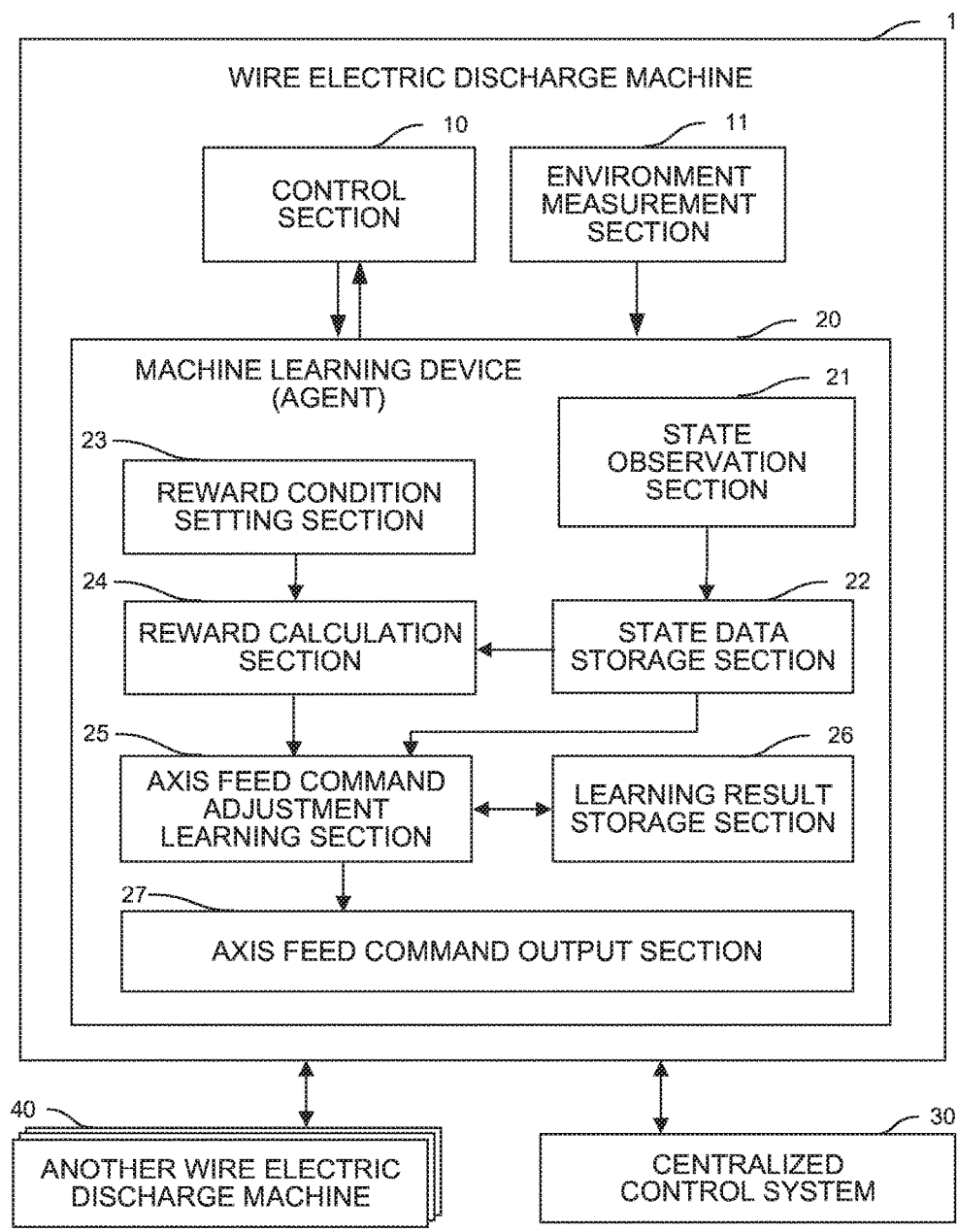
FIG. 6 is a functional block diagram of the wire electric discharge machine of FIG. 4.

FIG. 6 is a functional block diagram of the wire electric discharge machine of the present embodiment.

The control section 10 that controls the wire electric discharge machine 1 of the present embodiment analyzes the axis feed command by a program read from a memory (not shown) or the axis feed command based on the operation of an operator control panel (not shown), and controls the axial movement of the wire electric discharge machine 1 based on control data obtained as the analysis result. The wire electric discharge machine 1 includes a mechanism or a sensor (not shown) that detects the load applied to the movable axis, the speed and the acceleration of the movable axis, and damage to the mechanical section of the movable axis, and the control section 10 is configured to be capable of acquiring information indicative of the state of the wire electric discharge machine via the mechanism or the sensor.

In addition, the wire electric discharge machine 1 includes the environment measurement section 11 that measures the room temperature and the humidity around the wire electric discharge machine.

Note that it is assumed that the wire electric discharge machine 1 and the control section 10 include common configurations of wire electric discharge machines and controllers, and the detailed description thereof in the present specification will be omitted except configurations especially required in the description of the operation of the machine learning in the present invention. The machine learning device 20 shown in FIG. 6 corresponds to the "agent" in FIG. 1, and each of the configurations of the wire electric discharge machine 1, the control section 10, and the environment measurement section 11 other than the machine learning device 20 shown in FIG. 6 corresponds to the "environment" in FIG. 1.

When the command related to the movement of the axis is executed in the wire electric discharge machine 1 and positive acceleration is generated in the axis, the machine learning device 20 performs the adjustment operation of the axis feed command and the learning of the adjustment operation. The adjustment operation of the axis feed command and the learning thereof are temporarily ended at the point of time when the movement speed of the axis reaches the original movement speed specified by the command and, thereafter, when the command related to the movement of the axis is executed again and the positive acceleration is generated in the axis, the adjustment operation of the axis feed command and the learning of the adjustment operation by the machine learning device 20 are executed again. The start and end of the operation of the machine learning device 20 may be autonomously performed by the machine learning device 20 based on state data observed by a state observation section 21 described later, or the machine learning device 20 may start and end the operation based on a signal or the like from the wire electric discharge machine 1.

The machine learning device 20 that performs the machine learning includes the state observation section 21, a state data storage section 22, a reward condition setting section 23, a reward calculation section 24, an axis feed command adjustment learning section 25, a learning result storage section 26, and an axis feed command output section 27. As shown in FIG. 6, the machine learning device 20 may be provided in the wire electric discharge machine 1 or may also be provided in a personal computer outside the wire electric discharge machine 1.

The state observation section 21 observes the state information such as the load of the movable axis, the command speed of the movable axis, the speed of the movable axis, the command acceleration of the movable axis, the acceleration of the movable axis, the abnormal load level of the movable axis, and damage to the mechanical section of the movable axis of the wire electric discharge machine 1 obtained from the control section 10, and the room temperature and the humidity around the wire electric discharge machine 1 obtained from the environment measurement section 11, as data related to the movement state of the movable axis, and acquires the data in the machine learning device 20.

The state data storage section 22 receives and stores the data related to the movement state of the movable axis, and outputs the stored data related to the movement state of the movable axis to the reward calculation section 24 and the axis feed command adjustment learning section 25. The inputted data related to the movement state of the movable axis may be data acquired by the latest operation of the wire electric discharge machine 1 and may also be data acquired by the previous operation. In addition, it is also possible to input, store, and output the data related to the movement state of the movable axis stored in another wire electric discharge machine 40 or a centralized control system 30.

The reward conditions setting section 23 sets conditions for giving rewards in machine learning set by an operator or the like. Positive and negative rewards are given and may be appropriately set. In addition, an input to the reward conditions setting section 23 may be performed via a personal computer, a tablet terminal, or the like used in the intensive management system. However, with an input via the MDI (Manual Data Input) device not shown of the machine tool 1, it becomes possible to easily set conditions for giving rewards.

The reward calculation section 24 analyzes data related to moving state of a movable axis input from the state observation section 21 or the state data storage section 22 based on conditions set by the reward conditions setting section 23, and outputs calculated rewards to the axis feed command adjustment learning section 25.

Hereinafter, a description will be given of an example of reward conditions set by the reward conditions setting section 23 in the embodiment.

[Reward 1: Magnitude Relation Between Load and Abnormal Load Level of Movable Axis]

In the case where the load of the movable axis during the movement exceeds the abnormal load level in a time period from the previous adjustment of the axis feed command (adjustment of the axis feed command at time t−1) to the point of time of the current observation, the negative reward is provided in accordance with the degree. In the case where the load of the movable axis during the movement does not exceed the abnormal load level, the positive reward is provided in accordance with the degree.

[Reward 2: Speed of Movable Axis]

As the movement speed of the movable axis approaches and reaches the command speed specified by the movement command quickly, the positive reward is provided in accordance with the degree of the quickness. As the movement speed of the movable axis approaches and reaches the command speed specified by the movement command slowly, the negative reward is provided in accordance with the degree of the slowness.

[Reward 3: Occurrence of Damage to Mechanical Section of Movable Axis]

When the movable axis of the wire electric discharge machine 1 collides with workpiece or a jig, in the case where damage to the mechanical section of the movable axis (a wire guide or the like) occurs, the negative reward is provided. In the case where damage to the mechanical section of the movable axis (a wire guide or the like) does not occur, the positive reward is provided.

The axis feed command adjustment learning section 25 performs the machine learning (reinforcement learning) based on the data related to the movement state of the movable axis inputted from the state observation section 21 or the state data storage section 22, the adjustment result of the axis feed command performed by the axis feed command adjustment learning section 25 and the reward calculated in the reward calculation section 24.

Herein, in the machine learning performed by the axis feed command adjustment learning section 25, the state $s_t$ is defined by the combination of the data related to the movement state of the movable axis at given time t, to determine the adjustment amount of the axis feed command in accordance with the defined state $s_t$ corresponds to the action $a_t$, the adjustment of the axis feed command is performed by the axis feed command output section 27 described later and the adjustment result is outputted to the control section 10, the wire electric discharge machine 1 is controlled based on the adjusted axis feed command and the movement of the axis is performed, and the value calculated in the reward calculation section 24 based on the data obtained as the result corresponds to the reward $r_{t+1}$. The value function used in the learning is determined in accordance with the learning algorithm to be used. For example, in the case where the Q-learning is used, the learning may be appropriately advanced by updating the action value function Q ($s_t$, $a_t$) according to Formula (2) described above.

Figure 7:
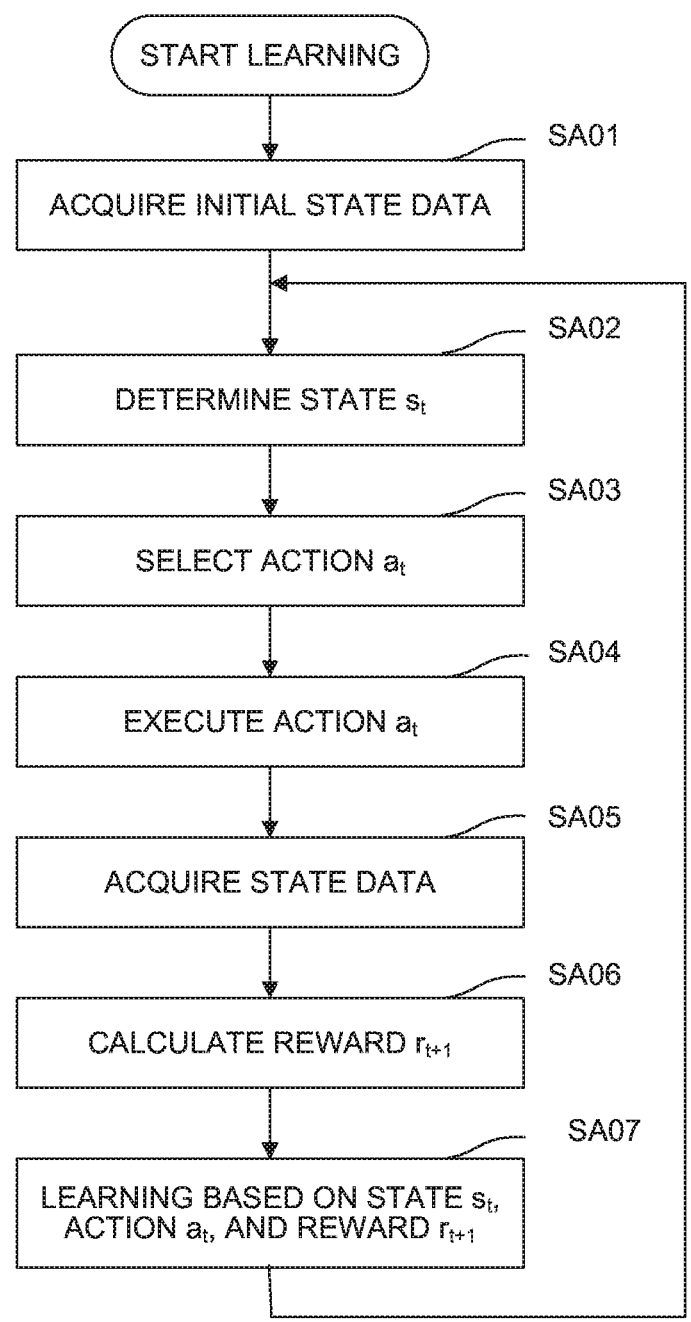
FIG. 7 is a flowchart showing the flow of the machine learning by a machine learning device of the wire electric discharge machine of FIG. 6.
Figure 8:
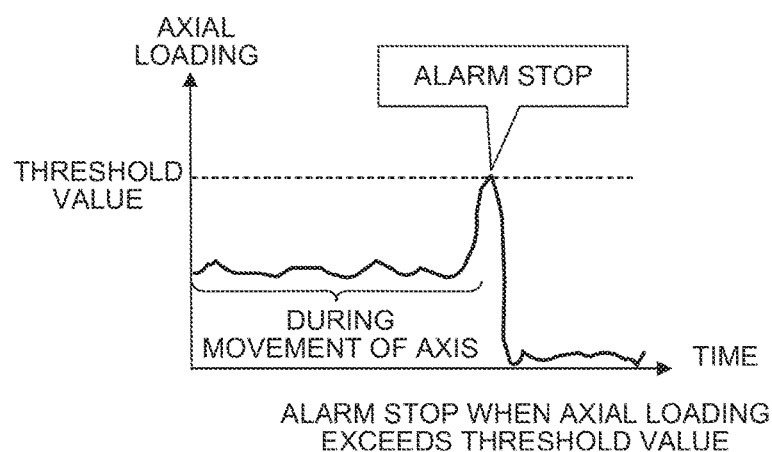
FIG. 8 is a view for explaining an alarm stop based on a load of a movable axis.
Figure 9:
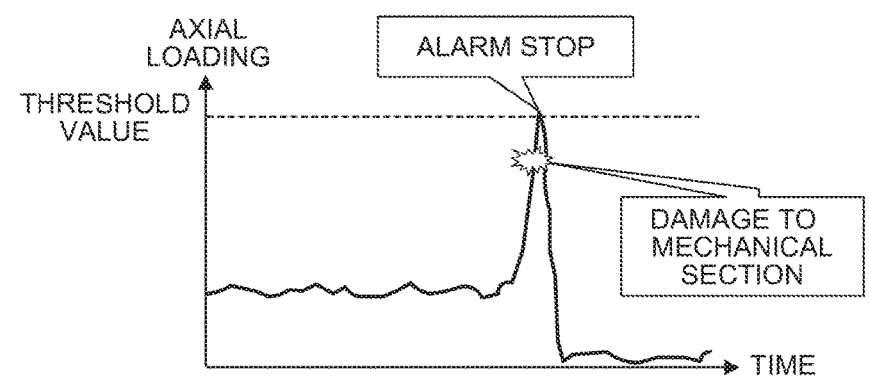
FIG. 9 is a view for explaining an example in which a mechanical section of the movable axis is damaged before the alarm stop.
Figure 10:
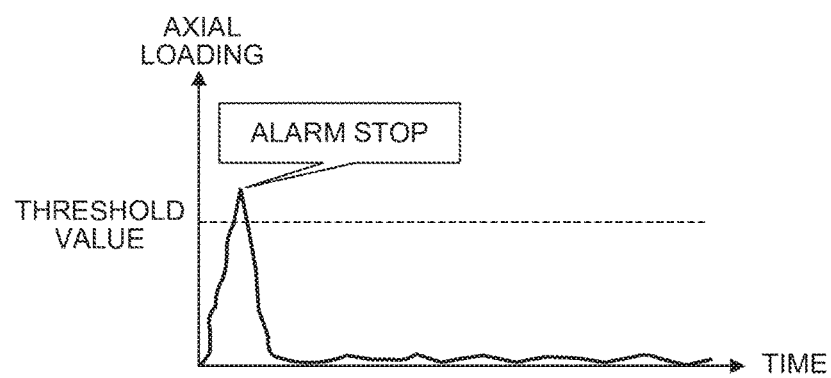
FIG. 10 is a view for explaining issuance of an alarm caused by starting the movement of the movable axis at a high speed.
Figure 11:
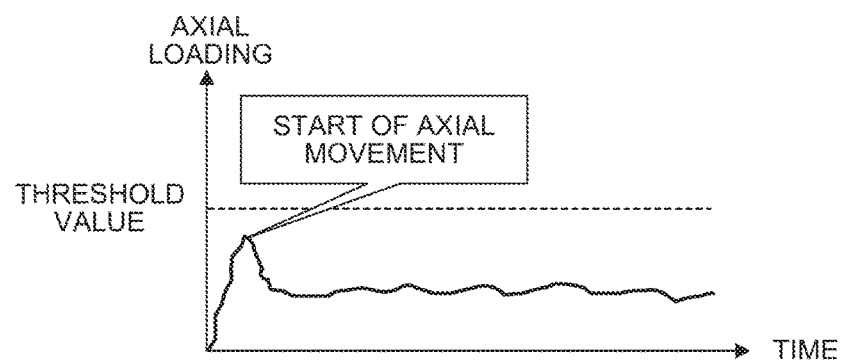
FIG. 11 is a view for explaining avoidance of the issuance of an alarm caused by starting the movement of the movable axis at a low speed.

By using a flowchart in FIG. 7, the flow of the machine learning performed by the axis feed command adjustment learning section 25 will be described. The processing is explained below according to respective steps.

[Step SA01] When the machine learning is started, the state observation section 21 acquires the data related to the movement state of the movable axis of the wire electric discharge machine 1.

[Step SA02] The axis feed command adjustment learning section 25 determines the current state $s_t$ based on the data related to the movement state of the movable axis acquired by the state observation section 21.

[Step SA03] The axis feed command adjustment learning section 25 selects the action $a_t$ (the adjustment of the axis feed command) based on the previous learning result and the state $S_t$ determined in Step SA02.

[Step SA04] The action $a_t$ selected in Step SA03 is executed.

[Step SA05] The state observation section 21 acquires the data related to the movement state of the movable axis indicative of the movement state of the axis in the wire electric discharge machine 1. At this stage, the state of the wire electric discharge machine 1 is changed by the action $a_t$ executed in Step SA04 with a temporal change from the time t to the time t+1.

[Step SA06] The reward calculation section 24 calculates the reward $r_{t+1}$ based on the data on the evaluation result acquired in Step SA05.

[Step SA07] The axis feed command adjustment learning section 25 advances the machine learning based on the state $s_t$ determined in Step SA02, the action $a_t$ selected in Step SA03, and the reward $r_{t+1}$ calculated in Step SA06, and the flow returns to Step SA02.

Returning to FIG. 6, the learning result storage section 26 stores the result of the learning by the axis feed command adjustment learning section 25. When the axis feed command adjustment learning section 25 uses the learning result again, the stored learning result is outputted to the axis feed command adjustment learning section 25. As described above, in storing of the learning result, the value function corresponding to the machine learning algorithm to be used may be appropriately stored by the supervised learning device such as the approximation function, the array, an SVM of a multi-value output, or the neural network.

Note that it is also possible to cause the learning result storage section 26 to receive and store the learning result stored by another wire electric discharge machine 40 or the centralized control system 30, and output the learning result stored by the learning result storage section 26 to another wire electric discharge machine 40 or the centralized control system 30.

The axis feed command output section 27 determines the adjustment amount of the axis feed command based on the result of the learning by the axis feed command adjustment learning section 25 and the data related to the current movement state of the movable axis. The determination of the adjustment amount of the axis feed command mentioned herein corresponds to the action a (see FIG. 1) used in the machine learning. In the adjustment of the axis feed command, the combination of change amounts of the individual parameters constituting the axis feed command may be prepared as a selectable action (e.g., Action 1=10% of the original axis feed command speed is added to the speed of the movable axis, Action 2=the speed of the movable axis is set to the original axis feed command speed, Action 3=10% of the acceleration determined from the time constant is subtracted from the acceleration of the movable axis), and the action that maximizes the reward obtained in the future based on the previous learning result may be selected. The selectable action may be the action that adjusts a plurality of items of the axis feed command (the speed of the movable axis, the acceleration of the movable axis, the abnormal load level) simultaneously. In addition, the progress of the learning of the axis feed command adjustment learning section 25 may be achieved by adopting the E greedy algorithm described above and selecting the random action with a predetermined probability. Note that, as the result of selection of the action, in the case where the movement speed of the axis exceeds the command speed by the original movement command, in the case where the acceleration of the axis exceeds the acceleration calculated from the time constant set for the axis, in the case where the movement speed is not more than 0, or in the case where the acceleration is less than 0, the corresponding action is not selected, and another action is selected.

Thereafter, the axis feed command output section 27 adjusts the axis feed command based on the adjustment amount of the axis feed command determined by the selection of the action, and the control of the axial movement of the wire electric discharge machine 1 by the control section 10 is performed based on the axis feed command adjusted by the axis feed command output section 27.

Thereafter, the acquisition of the current situation of the wire electric discharge machine 1 is performed by the machine learning device 20 again, and it is possible to obtain a more excellent learning result by repeating the learning by using the inputted data related to the movement state of the movable axis.

At a stage in which the adjustment of the axis feed command corresponding to the movement state of the axis in the wire electric discharge machine 1 by the control section 10 is properly performed as the result of the learning by the machine learning device 20 in this manner, the learning by the machine learning device 20 is completed.

When the wire electric discharge machine is actually operated by using learning data obtained after the learning is completed, the machine learning device 20 may be prevented from newly performing the learning, and the wire electric discharge machine may be repeatedly operated by using the learning data at the time of completion of the learning without altering it.

In addition, the machine learning device 20 of which the learning is completed (or the machine learning device 20 in which completed learning data of another machine learning device 20 is copied to the learning result storage section 26) may be attached to another wire electric discharge machine 40, and the wire electric discharge machine 40 may be repeatedly operated by using the learning data at the time of completion of the learning without altering it.

Further, by attaching the machine learning device 20 of which the learning is completed to another wire electric discharge machine with the learning function of the machine learning device 20 being kept enabled and continuously operating the wire electric discharge machine, it is possible to cause the machine learning device 20 to further learn a difference between the wire electric discharge machines and secular changes thereof, and operate the wire electric discharge machine while searching for the better adjustment of the axis feed command for the wire electric discharge machine.

The machine learning device 20 of the wire electric discharge machine 1 may perform the machine learning separately but, when a plurality of the wire electric discharge machines 1 have communication units for communication with the outside, it becomes possible to share the data related to the movement state of the movable axis stored by the state data storage section 22 of each of the wire electric discharge machines and the learning result stored by the learning result storage section 26 thereof by transmission and reception, and perform the machine learning more efficiently. For example, when the learning is performed while the axis feed command is fluctuated within a predetermined range, by advancing the learning concurrently by exchanging the data related to the movement state of the movable axis and the learning data between the wire electric discharge machines 1 and 40 while varying different adjustment amounts within a predetermined range in a plurality of the wire electric discharge machines 1 and performing the axial movement, it is possible to perform the learning efficiently.

Thus, when the exchange is performed between a plurality of the wire electric discharge machines 1, the wire electric discharge machines 1 may communication with each other via a host computer such as the centralized control system 30, the wire electric discharge machines 1 may communicate with each other directly, or the wire electric discharge machines 1 may use cloud computing. However, since there are cases where a large amount of data is handled, a communication unit having as high a communication speed as possible is preferable.

Although the embodiment of the present invention has been described thus far, the present invention is not limited to the above-described embodiment and can be embodied in various forms by making appropriate changes.

The invention claimed is:

1. A wire electric discharge machine that moves an axis in accordance with an axis feed command by a program or an operation of an operator, comprising:
a machine learning device that performs machine learning of an adjustment target parameter of the axis feed command in the movement of the axis and an adjustment amount of the adjustment target parameter, wherein
the machine learning device includes:
a state observation section that acquires state data as information indicative of a movement state of the axis in the movement of the axis;
a reward condition setting section that sets a reward condition;
a reward calculation section that calculates a reward based on the state data and the reward condition;
an axis feed command adjustment learning section that performs the machine learning of an axis feed command adjustment; and
an axis feed command output section that determines the adjustment target parameter of the axis feed command and the adjustment amount of the adjustment target parameter as an adjustment action based on a result of the machine learning of the axis feed command adjustment by the axis feed command adjustment learning section and the state data, adjusts the axis feed command based on the determined adjustment action, and outputs the adjusted axis feed command, wherein
the axis feed command adjustment learning section performs the machine learning of the axis feed command adjustment based on the adjustment action, the state data acquired by the state observation section after the movement of the axis based on the outputted adjusted axis feed command, and the reward calculated by the reward calculation section,
the wire electric discharge machine is configured to move the axis in accordance with the outputted adjusted axis feed command,
the reward condition provides a positive reward in a case where a load of the axis does not exceed an abnormal load level of the axis during the movement of the axis, or in a case where damage to a mechanical section of a movable axis does not occur at a time of a collision of the movable axis, and
the reward condition provides a negative reward in a case where the load of the axis exceeds the abnormal load level of the axis during the movement of the axis, or in a case where damage to the mechanical section of the movable axis occurs at the time of the collision of the movable axis.

2. The wire electric discharge machine according to claim 1, wherein
the state data includes at least any of a load of the axis, a command speed of the axis, a speed of the axis, a command acceleration of the axis, an acceleration of the axis, an abnormal load level of the axis, damage to a mechanical section of the axis, an ambient room temperature, and an ambient humidity.

3. The wire electric discharge machine according to claim 1, wherein
the adjustment target parameter of the axis feed command includes at least any of a speed of the axis, an acceleration of the axis, and an abnormal load level of the axis.

4. The wire electric discharge machine according to claim 1, further comprising:
a learning result storage section that stores the result of the learning by the axis feed command adjustment learning section, wherein
the axis feed command output section is configured to adjust the axis feed command of the axis based on the result of the learning of the axis feed command adjustment by the axis feed command adjustment learning section and the result of the learning of the axis feed command adjustment stored in the learning result storage section.

5. The wire electric discharge machine according to claim 1, wherein the wire electric discharge machine is connected to at least one other wire electric discharge machine, and exchanges or shares the result of the machine learning with the other wire electric discharge machine.

6. The wire electric discharge machine according to claim 1, wherein the reward condition provides a positive reward and a negative reward in a first case and a second case, respectively, wherein in the first case a speed of the axis reaches a command speed of the axis faster than in the second case.

* * * * *